(12) United States Patent
Kloehn et al.

(10) Patent No.: US 6,685,165 B1
(45) Date of Patent: Feb. 3, 2004

(54) VALVE ASSEMBLY HAVING AN ADJUSTING DIAPHRAGM MEANS

(75) Inventors: Michael Kloehn, Las Vegas, NV (US); Walter J. Kish, Jr., Las Vegas, NV (US)

(73) Assignee: Kloehn Company, Ltd., Las Vegas, NV (US)

( * ) Notice: Subject to any disclaimer, the term of this patent is extended or adjusted under 35 U.S.C. 154(b) by 0 days.

(21) Appl. No.: 09/669,201

(22) Filed: Sep. 25, 2000

(51) Int. Cl.[7] .......................... F16K 1/00; F16K 25/00; F16K 31/02
(52) U.S. Cl. .................. 251/331; 251/84; 251/129.15; 251/129.17
(58) Field of Search .......................... 251/331, 84, 87, 251/65, 129.15, 129.17, 124.18, 320, 322, 321

(56) References Cited

U.S. PATENT DOCUMENTS

| 2,934,090 A | | 4/1960 | Kenann et al. ........... 137/625.5 |
| 3,671,009 A | * | 6/1972 | Stampfli ..................... 251/129 |
| 3,680,830 A | * | 8/1972 | Low et al. ..................... 251/86 |
| 4,237,931 A | | 12/1980 | Rafaely .................... 137/625.5 |
| 4,703,775 A | * | 11/1987 | Pastrone .................. 137/625.3 |
| 4,706,934 A | * | 11/1987 | Brown ......................... 251/87 |
| 4,944,487 A | * | 7/1990 | Holtermann ........... 251/129.17 |
| 5,007,458 A | | 4/1991 | Marcus et al. ........... 137/625.5 |
| 5,333,643 A | * | 8/1994 | Gilchrist et al. ............ 137/605 |

* cited by examiner

Primary Examiner—Kevin Shaver
Assistant Examiner—David A Bonderer
(74) Attorney, Agent, or Firm—Kenneth L. Sherman, Esq.; Myers Dawes Andras & Sherman, LLP; Vic Y. Lin, Esq.

(57) ABSTRACT

A valve assembly having a cap defining a first and second fluid flow passage for allowing the flow of fluid is attached to a seat member which is coupled to an actuator. A plunger having an adjustably attached diaphragm is maintained within the seat member and the actuator, and the plunger positions the diaphragm over the first and second fluid flow passage. The actuator controls the plunger and determines the retraction of the plunger to allow fluid flow and the insertion of the plunger to prevent fluid flow.

23 Claims, 3 Drawing Sheets

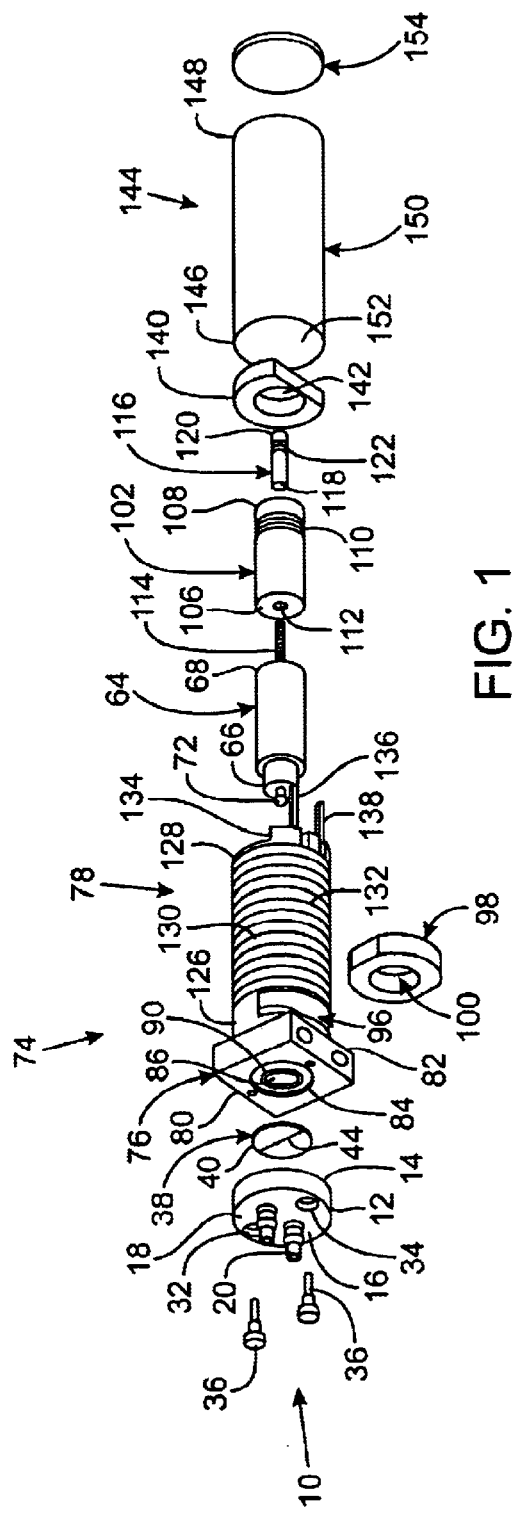
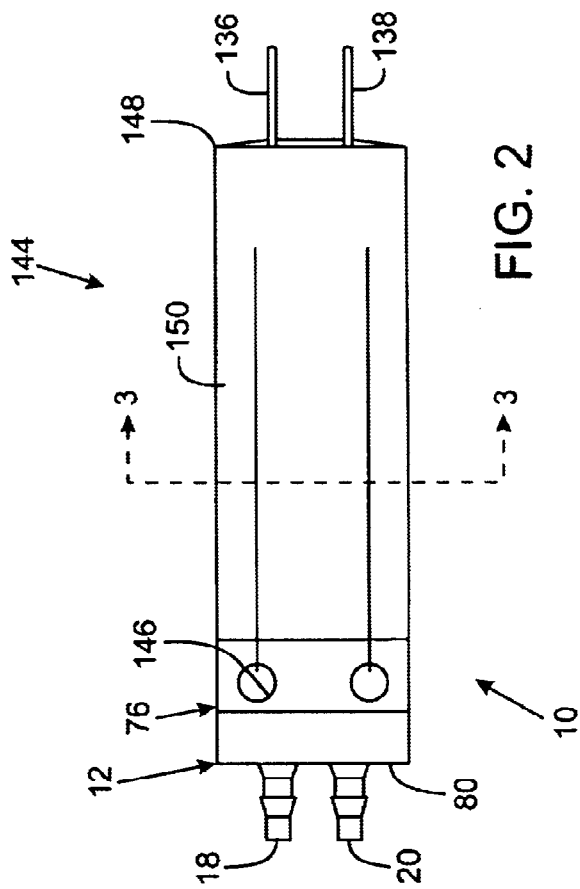
FIG. 1
FIG. 2

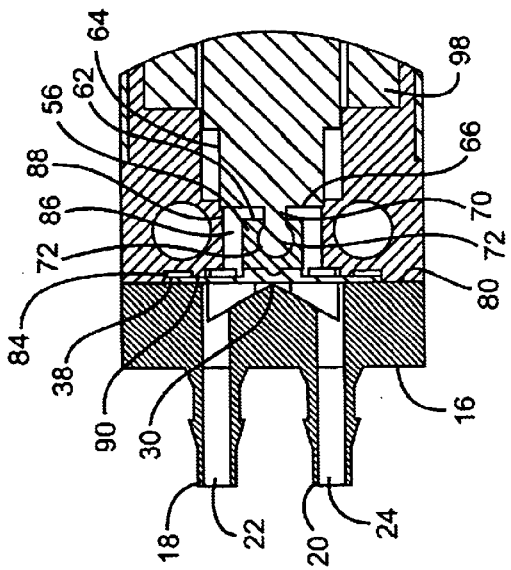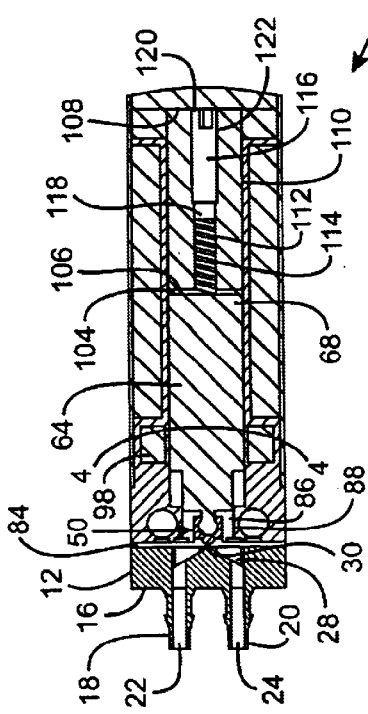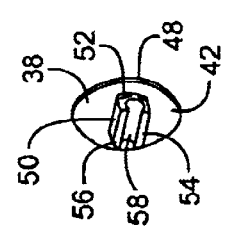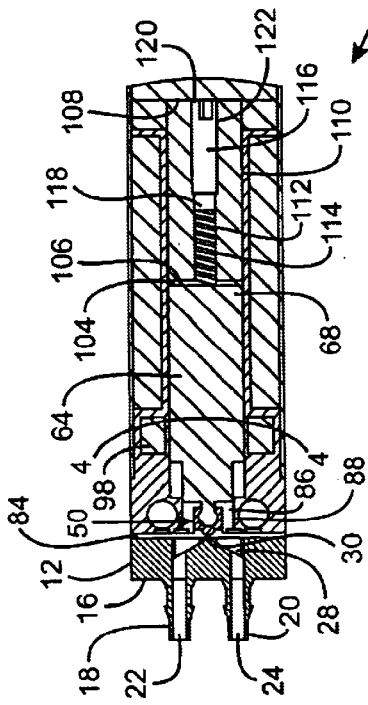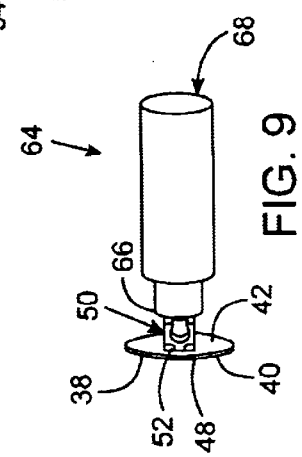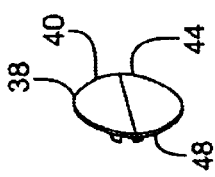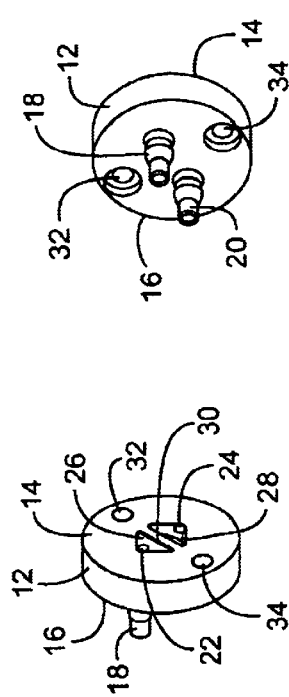

VALVE ASSEMBLY HAVING AN ADJUSTING DIAPHRAGM MEANS

FIELD OF THE INVENTION

This invention relates to valves for controlling the flow of fluids, and especially to a solenoid valve utilizing a self adjusting fluid control means to ensure accurate and precise fluid flow and where the fluid flow control means may easily be replaced without having to disassemble the entire valve.

BACKGROUND OF THE INVENTION

There is a widespread demand for relatively small valves that can operate reliably, quickly, efficiently, and are capable of lasting for many millions of cycles. While there are applications for such valves in many fields, there are special requirements in chemical and biotechnology laboratories, ink jet printers, flux dispensing in manufacturing computer chips, and any other industries where accurate and precise fluid flow is necessary. In these applications, valves are opened frequently to allow the passage of various fluids therethrough in an exact and controlled fashion.

Bidirectional valves are known in the art where control of fluid flow is obtained independent of the direction of the flow of the fluid media. Such valves generally function by providing a flexible diaphragm which is directly attached to a plunger or other means such that the diaphragm is biased toward a valve seat closing the flow passage and thereby impeding fluid flow. The diaphragm is attached to the plunger in a rigid manner by using a threaded element or it is imbedded into the plunger. Such rigid attachment subjects the diaphragm to repeated opposing forces both at the point of attachment and at any radial compression point and may cause weakness in the diaphragm and failure thereof. In addition, some instruments use a plurality of the valves and it may be expensive and disruptive to find and replace individual valves whose diaphragm has failed.

Alternatively, U.S. Pat. No. 4,944,487 to Holterman discloses a diaphragm valve wherein the plunger is not attached to the diaphragm. The plunger biases the diaphragm against the valve seat and the diaphragm is maintained in place by radial compression along the perimeter of the diaphragm. Accordingly, Holterman's valve operates passively in response to pressure from the flow medium when the plunger is retracted. The passive operation of the diaphragm may fail if the pressure of the fluid is insufficient to deform the diaphragm in order to allow the flow thereof. In addition, the chemicals contained within certain fluids may crystallize and attach the diaphragm to the valve seat. Furthermore, the radial compression exerted on the diaphragm may cause the failure thereof by puncturing same by the exertion of such pressure.

The prior art does not address the need for accurate control of the volume of fluid dispensed over many millions of cycles of use where the diaphragm is adapted to adjust upon each opening and closure thereby reducing the stress placed thereon. Therefore, there remains a long standing and continuing need for an advance in the art of valve assemblies that is simpler in both design and use, is more economical, sturdy, and efficient in its construction and use, and can quickly be installed and removed from instrumentation having a plurality thereof.

SUMMARY OF THE INVENTION

Accordingly, it is general object of the present invention to overcome the disadvantages of the prior art.

In particular, it is an object of the present invention to provide a valve apparatus that can operate with longevity.

It is another object of the present invention to provide a valve assembly that is economical to produce.

It is yet another object of the present invention to provide a valve assembly that is easily maintained but is sufficiently economical to replace.

It is another object of the present invention to provide a valve assembly that has a crisper opening and closing.

It is another object of the present invention to provide a valve assembly that provides easy adjustment of the rate of fluid flow therethrough.

It is another object of the present invention to provide a valve assembly that allows operation of the diaphragm in vacuum.

It is still another object of the present invention to provide a valve assembly that provides quick and exquisitely small valve movements with remarkable repetition relative to the volume of fluids passing therethrough.

It is another object of the present invention to provide a valve assembly that allows the adjustment of the diaphragm upon each opening and closing in order to achieve better fluid flow control.

It is yet another object of the present invention to provide a valve assembly that reduces the risk of leakage.

In keeping with the principles of the present invention, a unique self-adjusting diaphragm solenoid valve assembly is presented which overcomes the shortfall of the prior art. It is to be understood that the adjustable nature of the diaphragm may be incorporated into any valve assembly that is known in the art and is not limited to the solenoid valve assembly described herein.

The valve assembly has a cap that has an inner surface and an outer surface and a first and second aperture that extend from the inner surface and through the outer surface. On the outer surface, protrusions may be provided to connect the apertures to conduits for directing the flow of fluid to the apertures. On the inner surface, the apertures are symmetrically positioned and define a wall therebetween. A diaphragm that is preferably elastomeric is of sufficient size to simultaneously occlude the first and second apertures.

The cap is removably attached to a seat portion such that the diaphragm is maintained therebetween. The seat portion has a depression which is adapted to accommodate the diaphragm therein. The seat portion is further connected to the actuation region which is preferably a solenoid actuation means. A void extends axially through both said actuation region and the seat portion. A plunger means is received within said void and is adapted to connect with the diaphragm.

The diaphragm preferably has an elliptical shape and thus has a major and minor axis. Along the minor axis on a first side of the diaphragm there extends a first projection which is adapted to be received on the wall of the cap between the two apertures to seal between the same. On a second side of the diaphragm along is located the connecting means that connects the diaphragm to the plunger means in a pivoting manner.

The plunger means has an extension that connects a protuberance to the plunger means and the extension is smaller in diameter than the protuberance. The connecting means has a first prominence and a second prominence which extend parallel with the minor axis of the diaphragm and oppose one another to create an opening therebetween. A first lip and a second lip extend inwardly from first and second prominences and thereby narrow the size of the opening.

The opening is shaped to accommodate the protuberance therein in a tight fitting form and is further defined by the first and second lip. The first and second lip engage the protuberance and allow retraction of the diaphragm when the plunger is retracted. However, first and second lip allow enough opening therebetween to accommodate the extension and yet allow pivoting of the protuberance therein.

Thereby, when the plunger is retracted, the diaphragm is disengaged from the inner surface and wall of the cap and fluid is allowed to flow between the first and second aperture. When the plunger is reinserted, the diaphragm is biased against the inner surface and the wall and the pivoting attachment of the connecting means to the protuberance allow the diaphragm to adjust to achieve optimal occlusion of the first and second aperture to prevent fluid flow therebetween.

Such stated objects and advantages of the invention are only examples and should not be construed as limiting this invention. These and other objects, features, aspects, and advantages of the invention herein will become more apparent from the following detailed description of the embodiments of the invention when taken in conjunction with the accompanying drawings and the claims that follow.

BRIEF DESCRIPTION OF THE DRAWINGS

It is to be understood that the drawings are to be used for the purposes of illustration only and not as a definition of the limits of the invention.

In the drawings, wherein similar reference characters denote similar elements throughout the several views:

FIG. 1 is a perspective view of an unassembled valve apparatus.

FIG. 2 is an elevational view of an assembled valve apparatus.

FIG. 3 is a cross-sectional view of an assembled valve apparatus taken along line 3—3 of FIG. 2.

FIG. 4 is an enlarged partial cross-sectional view of an assembled valve apparatus emphasizing the portion taken along line 4—4 of FIG. 3.

FIG. 5 is rearward perspective view of the cap.

FIG. 6 is a frontal perspective view of the cap.

FIG. 7 is a frontal perspective view of the diaphragm.

FIG. 8 is a rearward perspective view of the diaphragm.

FIG. 9 is an elevation view illustrating the attachment of the diaphragm to the first member.

DETAILED DESCRIPTION OF THE INVENTION

Figure 10:
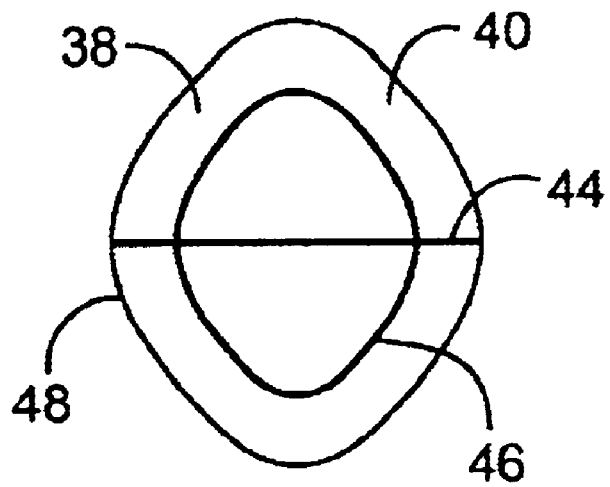
FIG. 10 is a frontal perspective view of an alternate preferred embodiment of the diaphragm.

Referring now to FIG. 1, therein is illustrated an exploded view of valve apparatus 10. In addition, for a better understanding of the invention, an assembled elevational view is illustrated in FIG. 2, and an assembled cross-sectional view is illustrated in FIGS. 3 and 4, which should be viewed in conjunction with FIG. 1 in the following description. Valve apparatus 10 has a cap 12 that may be made of any rigid material, but is made of a plastic or resin material in general, and in a preferred embodiment, cap 12 is made of polyetheretherketone which is commonly referred to as "PEEK." Cap 12 is preferably circular and has an inner surface 14 and an outer surface 16. At least a first protrusion 18 and a second protrusion 20 extend from outer surface 16. A first aperture 22 and a second aperture 24 are axially defined in first protrusion 18 and second protrusion 20 respectively. First protrusion 18 and second protrusion 20 are adapted to maintain respective conduits (not shown) thereon for delivery and flow of fluid therethrough.

Now also referring to FIGS. 5 and 6, first aperture 22 and second aperture 24 extend through inner surface 14 of cap 12. In a preferred embodiment, inner surface 14 defines a first cavity 26 and a second cavity 28 therein. First cavity 26 and second cavity 28 are preferably symmetrically located in relation to one another and are in the shape of triangles in the plane of inner surface 14 wherein a base of each cavity 26 and 28 are substantially juxtaposed such that a wall 30 is created therebetween. Although cavity 26 and 28 are illustrated to have a triangular shape, it is to be understood that alternate shapes may also be utilized.

Cavities 26 and 28 are adapted to communicate with first aperture 22 and second aperture 24. In a preferred embodiment, first and second apertures 22 and 24 are in communication with an apex of the triangular shape of cavity 26 and 28 respectively, wherein the apexes are located distal to the base of each cavity 26 and 28. In addition, in a preferred embodiment, the depth of first cavity 26 and second cavity 28 is greater at the apex in comparison to each corresponding base thereof. At least a first opening 32 and a second opening 34 are located on cap 12 and are preferably substantially symmetrically located on outer surface 16 and axially extend through inner surface 14. First opening 32 and second opening 34 are adapted to each receive an attaching means 36 such as, but not limited to, a threaded element or a pin member. It is also to be understood that the attaching means may be any appropriate adhesive means known in the art whereby the first and second openings 32 and 34 would be unnecessary for attachment and may be omitted.

Now also referring to FIGS. 7, 8, and 9, a diaphragm 38 is preferably comprised of an elastomeric material or any other appropriate material known in the art. Diaphragm 38 has a first side 40 and a second side 42. The diameter of diaphragm 38 is of sufficient size to cover both first cavity 26 and second cavity 28 simultaneously. In a preferred embodiment, diaphragm 28 is substantially elliptically shaped such that the major axis is substantially aligned with the apexes of first cavity 26 and second cavity 28 and extends therebeyond. In addition, the minor axis of diaphragm 38 is adapted to axially align with wall 30 and is of sufficient size to enclose first cavity 26 and second cavity 28. When first side 40 of diaphragm 38 is received on inner surface 14 of cap 12, both cavities 26 and 28 are closed such that fluid therebetween is prevented. In a preferred embodiment, a first projection 44 extends along the minor axis of first side 40 of diaphragm 38. First projection 44 is adapted to be removably received on wall 30 of cap 12 in a hermetically sealed fashion.

Now also referring to FIG. 10, therein is illustrated another preferred embodiment of diaphragm 38 wherein a second projection 46 is located on first side 40 of diaphragm 38. Second projection 46 is a contiguous wall that is substantially equidistantly located from an outer edge 48 of diaphragm 38. Second projection 46 is located at a sufficient distance such that both first cavity 26 and second cavity 28 are enclosed thereby at all times when valve 10 is assembled.

Figure 11:
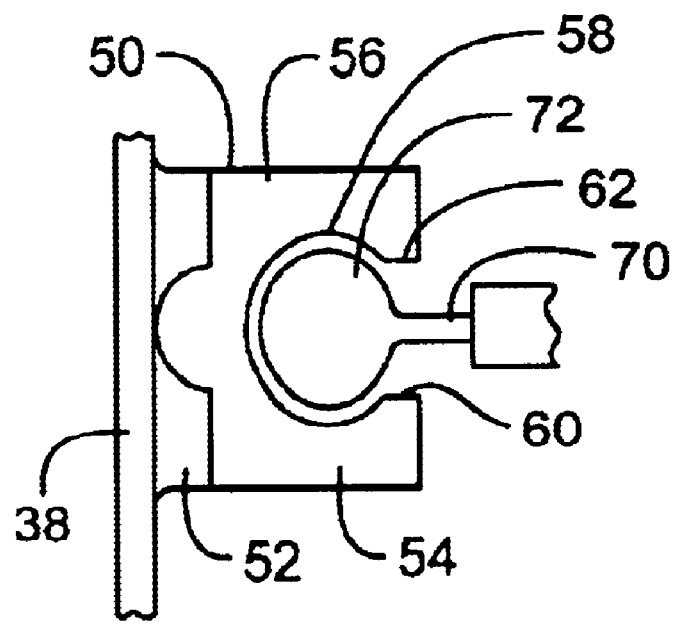
FIG. 11 is an enlarged partial elevational view illustrating the connecting means receiving the protuberance.

Now also referring to FIG. 11, a connecting means 50 is attached to second side 42 of diaphragm 38 in a generally centrally located position. Connecting means 50 is made of any substantially rigid material such as but not limited to metals and plastics. Connecting means 50 has a base 52 that attaches to second side 42 and has a first prominence 54 and a second prominence 56 extending from base 52. First prominence 54 and second prominence 56 oppose one another and define an opening 58 therebetween, and opening 58 extends axially perpendicular to prominences 54 and 56. First prominence 54 and second prominence 56 have a first lip 60 and a second lip 62 respectively that extend inwardly to narrow opening 58 therebetween.

A first member 64 has a generally elongated shape having a first end 66 and a second end 68. First member 64 may be constructed of any substantially rigid material and is preferably metallic or any material that responds to magnetic forces in general, and more specifically, first member 64 is constructed of magnetic 430F stainless steel or similar magnetic alloy. First end 66 has an extension 70 thereon with a protuberance 72 extending therefrom. Protuberance 72 is larger than extension 70 in diameter and is adapted to be inserted into opening 58 of connecting means 50 whereby extension 70 is maintained between first lip 60 and second lip 62. Upon retraction of first member 64, protuberance 70 engages first lip 60 and second lip 62 and thus retracts diaphragm 38 therewith. Opening 58 is of sufficient size to allow rotational movement of protuberance 70 therein but maintains a proximal distance between protuberance 70 and first lip 60 and second lip 62 so that immediate retraction response can be obtained.

A first component 74 has a seat portion 76 and an actuation portion 78 communicating therewith. Seat portion 76 has a primary side 80 and a secondary side 82 that is connected to actuation portion 78. Primary side 80 has a depression 84 that is generally elliptical in shape and is of sufficient size to receive second side 42 of diaphragm 38 therein in a generally form fitting fashion. In addition, depression 84 is of sufficient depth such that when second side 42 of diaphragm 38 is received therein, first side 40 of diaphragm 38 and primary side 80 of seat portion 80 are on an even plane. A first void 86 is substantially centrally located within depression 84 and extends axially through and out of secondary side 82 of seat portion 76 and is defined by an inner wall 88. First void 86 is of sufficient size to accommodate connecting means 50 of diaphragm 38 therein but also to prevent diaphragm 38 from passing therethrough. A boundary 90 extends from depression 84 and is less than primary side 80 in height and is located radially outward to void 86. Boundary 90 is of sufficient size to enclose first cavity 26 and second cavity 28 of cap 12 in order to maintain hermetic contact of diaphragm 38 to inner surface 14.

A primary opening 92 and a secondary opening 94 may be provided on primary side 80 of seat portion 76 such that they are axially aligned with first opening 32 and second opening 34 respectively of cap 12. After diaphragm 38 is attached to first member 64, a first attaching means 36 may be inserted into first opening 32 and primary opening 92 and a second attaching means 36 may be inserted into second opening 34 and secondary opening 94 to join cap 12 to seat portion 76 in a removable fashion.

First void 86 also extends through actuation portion 78 and is adapted to receive first member 64 therein in a sliding fashion. First member is inserted into first void 86 from the actuation portion 78 such that protuberance 72 extends out of primary side 80 of seat portion 76 and receives connecting means 50 thereon. Cap 12 is in turn attached to primary side 80 of seat portion 76 to maintain diaphragm 38 within depression 84.

In a preferred embodiment, a bore 96 is created between seat portion 76 and actuation portion 78 that is perpendicular to void 86. A first element 98 is adapted to be received within bore 96 and has a first hollow 100 therein that is axially aligned with void 86. First element 98 is inserted into bore 96 and first member 64 is inserted into void 86 as previously described and also passes through first hollow 100. First element 98 is preferably disk shaped and is metallic or any material that responds to magnetic forces in general, and more specifically, first element 98 is constructed of magnetic 430F stainless steel or similar magnetic alloy.

A second member 102 having a primary end 106 and a secondary end 108 is received within first void 86 after first member 64 has been inserted such that a space 104 is maintained between second end 68 of first member 64 and primary end 106 of second member 102. Secondary member 102 has a control element 110 thereon that engages inner wall 88 of actuation portion and determines the amount of space 104 between first member 64 and second member 102. For purposes of illustration but not limitation, control element 110 is preferably a threaded means on second member 102 to control the depth of insertion thereof into first void 86. Second member 102 may be constructed of any substantially rigid material and is preferably metallic or any material that responds to magnetic forces in general, and more specifically, Second member 102 is constructed of magnetic 430F stainless steel or similar magnetic alloy.

A hole 112 is substantially axially defined within second member 102 and extends from primary end 106 and out of secondary end 108. Hole 112 is adapted to receive a resilient means 114 therein such that resilient means 114 biases against second end 68 of first member 64. For purposes of illustration but not limitation, resilient means 114 is a stainless steel coil or spring. A third member 116 having a front end 118, a back end 120, and a control member 122 thereon has a generally elongated shape and is then inserted into hole 112. Third member 116 may be constructed of any substantially rigid material and is preferably metallic or any material that responds to magnetic forces in general, and more specifically, third member 116 is constructed of magnetic 430F stainless steel or similar magnetic alloy. Front end 118 is in contact with resilient means 114 such that resilient means 114 is maintained between front end 118 and second end 68 of first member 64.

In a deactivated state, resilient means 114 forces first member 64 towards cap 12 such that diaphragm 38 prevents fluid flow between first aperture 22 and second aperture 24. The force with which first member 64 is forced towards cap 12 is determined by control member 122. If a greater force is needed, control member 122 is adjusted to shorten the distance between front end 118 of third member 116 and second end 68 of first member 64. Conversely, the force of resilient means 114 may also be reduced by increasing the distance between front end 118 of third member 116 and second end 68 of first member 64.

Actuation portion 78 has an actuator means 124 that is exemplary of a wide variety of actuators which can be used to move first member 64 axially and disengage diaphragm 38 from wall 30 and to open fluid flow between first cavity 26 and second cavity 28. For example, actuator means such as, but not limited to, pneumatic actuators, hydraulic actuators, manual actuators, and electrical solenoid actuators may be used. In a preferred embodiment, an electrical solenoid actuator is used and is described herein; however, it is to be understood that the invention is not to be limited thereby. Actuator means 124 has a front portion 126, back portion 128, and middle portion 130 in the shape of a bobbin whereby middle portion 130 interconnects front portion 126 and back portion 128. A solenoid winding 132 is wound around middle portion 130 and extends between front portion 126 and back portion 128. Solenoid winding 132 is preferably made of elongated copper but may be made of any material that can conduct an electrical current.

A prominent portion 134 extends from back portion 128 of actuator means 124 and has connected thereto a first pin 136 and a second pin 138. First pin 136 and second pin 138 respectively connect to opposing ends of solenoid winding 132 and supply electricity thereto. First pin 136 and second pin 138 may be mounted onto a printed circuit board (PCB) which allows a plurality of valves 10 to be located in close proximity to each other without the need for electrical wiring and connectors.

A second element 140 having a second hollow 142 therethrough is adapted to be received on back portion 128 of actuation portion 78 such that second hollow 142 is axially aligned with first void 86. Second hollow 142 is of sufficient size to accommodate second member 102 therein.

A housing 144 has a first section 146 and a second section 148 interconnected by a middle section 150. Housing 144 axially defines a vacuous portion 152 therein. First section 146 attaches to secondary side 82 of seat portion 76 such that actuation portion 78 and all the components therein are maintained within vacuous portion 152. First section 146 may be attached to secondary side 82 by a binding means generally, but specifically, UV cementing may be used. Housing 144 may be constructed of any substantially rigid material and is preferably metallic or any material that responds to magnetic forces in general, and more specifically, housing 144 is constructed of magnetic 430F stainless steel or similar magnetic alloy.

Fluid enters from first aperture 22 of first protrusion 18 and is maintained within a region defined by first side 40 and first cavity 26. It is to be understood that although first aperture is described for fluid inflow, it may also be reversed such that first aperture 22 functions for outflow. When an electrical current is applied to first pin 136, solenoid winding 132, first element 98, second member 102, third member 116, second element 140 and housing 144 form a magnetic flux. The magnetic flux attracts second end 68 of first member 64 towards primary end 106 of second member 102 and overcomes the force exerted by resilient means 114. As a consequence, diaphragm 38 disengages from wall 30 such that fluid flows to second cavity 28 and out through second aperture 24 of second protrusion 20.

When the adjustment is completed and the correct rate of fluid flow is attained, a sealing means 154 may be applied to second section 148 of housing 144 to maintain the proper rate of fluid flow. Very quick and exquisitely small valve movements can be attained with increased repetitiveness and accuracy of the volume of fluid passing therethrough. In addition, the rotational movement provided by connecting means 50 and protuberance 70 of first member 64 allows diaphragm 38 to return to its original position and can self adjust to achieve optimal contact with wall 30.

If diaphragm 38 should need replacement, cap 12 can be removed from primary side 80 of seat portion 76. Connecting means 50 can then easily be removed from protuberance 72 and a new diaphragm 38 mounted thereon in a similar fashion. Once again cap 12 may be connected to primary side 80 of seat portion 76 and valve apparatus 10 would function in the same manner as before replacement because control element 110 and control member 122 would not have been adjusted. Therefore, the disengagement distance between diaphragm 38 and wall 30 would not be affected and the rate of fluid flow would remain constant.

The materials used in constructing the valve can be selected to provide resistance to various reagents and solutions. Valve apparatus 10 may also be made of a clear material to allow for visual inspection thereof. Valve apparatus 10 may be used alone or in concert with a plurality of valve apparatuses 10. Valve apparatus 10 may be used in a variety of machines and for a variety of purposes such as, but not limited to, ink dispensing in printers, flux dispensing for computer chips, and micro dispensing for the biotechnology and chemical industry.

While the above description contains many specificities, these should not be construed as limitations on the scope of the invention, but rather as an exemplification of one preferred embodiment thereof. Many other variations are possible without departing from the essential spirit of this invention. Accordingly, the scope of the invention should be determined not by the embodiment illustrated, but by the appended claims and their legal equivalents.

What is claimed is:

1. A valve apparatus for accurately controlling flow of fluids, comprising:
    a cap having an inner surface and an outer surface, a first cavity and a second cavity extending through said cap to allow fluid flow therebetween;
    an actuation means for receiving said cap thereon, and a void being defined through said actuation means;
    a diaphragm removably engaging said inner surface and being of sufficient size to occlude said first cavity and said cavity simultaneously, the diaphragm comprising a projection that biases against said inner surface of said cap and hermetically prohibits fluid flow between said first cavity and said second cavity; and
    a first member being maintained within said void of said actuation means, and said first member loosely interlocked with said diaphragm to allow said diaphragm to adjust while said first member forces said diaphragm against said inner surface as a result of a resilient means in a deactivated state and said actuation means withdrawing said diaphragm in an activated state, whereby control of fluid flow between said first cavity and said second cavity is achieved.

2. The valve apparatus of claim 1, wherein a protuberance extends from said first member and said protuberance loosely interlocks with said diaphragm.

3. The valve apparatus of claim 1, wherein an extension being of small diameter than a protuberance attaches said protuberance to said first member.

4. The valve apparatus of claim 3, wherein a connecting means is located on said diaphragm and engages said protuberance in a swiveling manner.

5. The valve apparatus of claim 4, wherein said connecting means is a socket and is adapted to receive said protuberance therein.

6. The valve apparatus of claim 4, wherein said connecting means further comprises a first prominence and a second prominence opposing one another and having a first lip and a second lip respectively that extend inwardly therefrom to define an opening therein to receive said protuberance.

7. The valve apparatus of claim 6, wherein said opening is substantially circular to allow pivoting attachment of said protuberance therein.

8. The valve apparatus of claim 7, wherein said first lip and said second lip decrease a distance of said opening such that said protuberance is engaged therein and allows retraction of said diaphragm.

9. The valve apparatus of claim 8, wherein said diaphragm is substantially oval and has a major axis and a minor axis and said connecting means extends along a substantial length of said minor axis on a second side of said diaphragm and said projection extends along said minor axis on a first side of said diaphragm.

10. The valve apparatus of claim 9, wherein said protuberance is removable from said connecting means when moved in a plane parallel to said diaphragm.

11. The valve apparatus of claim 6, wherein said opening extends in a parallel plane in relation to said diaphragm.

12. A valve assembly for controlling fluid flow, comprising:

a cap having an inner surface and an outer surface, a first cavity and a second cavity extending through said cap to allow fluid flow therebetween, and a wall on said inner surface separating said first cavity and said second cavity;

a diaphragm removably biasing against said wall and said inner surface and being of sufficient size to occlude said first cavity and said second cavity simultaneously when biased against said inner surface and said wall, the diaphragm comprising a first projection adapted to removably engage said wall on said cap and hermetically prohibit fluid flow between said first cavity and said second cavity;

a first component having a seat portion and an actuation portion and a void being axially defined therethrough, said seat portion being adapted to receive said cap thereon to maintain said diaphragm therebetween; and a first member being maintained within said void in a movable manner and said first member loosely interlocks with said diaphragm on a side distal to said cap to allow said diaphragm to adjust while said first member forces said diaphragm against said inner surface and said wall as a result of a resilient means in a deactivated state and an actuation means withdrawing said diaphragm in an activated state to control fluid flow.

13. The valve assembly of claim 12, wherein said seat portion has a depression thereon and is adapted to accommodate said diaphragm in a sliding manner.

14. The valve assembly of claim 13, wherein an extension connects a protuberance to said first member and said extension has a shorter diameter than said protuberance, and said protuberance engages said diaphragm in an adjustable manner.

15. The valve assembly of claim 14, wherein a connecting means is located on said diaphragm and engages said protuberance in a pivoting manner.

16. The valve assembly of claim 15, wherein said connecting means is a socket and said protuberance is a ball, wherein said socket extends past a midway point on said ball and maintains same therein in a pivoting manner.

17. The valve assembly of claim 15, wherein said connecting means further comprises a first prominence and a second prominence opposing one another and having a first lip and a second lip respectively that extend inwardly therefrom to define a substantially circular opening therein to receive said protuberance in a pivoting manner.

18. The valve assembly of claim 17, wherein said opening extends in a parallel plane in relation to said diaphragm and said first lip and said second lip decrease a distance of said opening such that said protuberance is engaged therein and allows retraction of said diaphragm.

19. The valve assembly of claim 12, wherein said diaphragm is substantially elliptical in shape and further comprises a major axis and a minor axis, and a peripherally contiguous second projection being equidistantly spaced from an outer edge of said diaphragm and being sufficiently positioned to enclose said first and second cavity, said first projection extending along said minor axis.

20. A valve assembly for controlling fluid flow, comprising:

a cap having an inner surface and an outer surface, a first cavity and a second cavity extending through said cap to allow fluid flow therebetween, and a wall on said inner surface being defined between said first cavity and said second cavity to separate same;

a substantially oval diaphragm having a minor axis and a major axis a projection along said minor axis, and said diaphragm being of sufficient size to occlude said first cavity and said second cavity simultaneously when biased against said inner surface and when said projection is biased against said wall;

a first component having a seat portion and an actuation portion and a void being axially defined therethrough, said seat portion being adapted to receive said cap thereon to maintain said diaphragm therebetween;

a first member being maintained within said void in a movable manner and said first member engaging said diaphragm in a pivoting manner on a side distal to said cap, and said first member forcing said diaphragm against said inner surface and said wall as a result of a resilient means to prevent fluid flow in a deactivated state; and an actuation means being located on said actuation portion in order to cause said first member to disengage said diaphragm from said inner surface and said wall to allow fluid flow in an active state.

21. A valve apparatus for accurately controlling flow of fluids, comprising:

a cap having an inner surface and an outer surface, a first cavity and a second cavity extending through said cap to allow flow therebetween;

an actuation means for receiving said cap thereon, and a void being defined through said actuation means;

a diaphragm removably engaging said inner surface and being of sufficient size to occlude said first cavity and said second cavity simultaneously;

a first member being maintained within said void of said actuation means, and said first member engaging said diaphragm and forcing said diaphragm against said inner surface as a result of a resilient means in a deactivated state, and said actuation means withdrawing said diaphragm in an activated state, whereby control of fluid flow between said first cavity and said second cavity is achieved;

an extension being of small diameter than a protuberance attaches said protuberance to said first member;

a connecting means is located on said diaphragm and engages said protuberance in a swiveling manner;

said connecting means further comprising a first prominence and a second prominence opposing one another and having a first lip and a second lip respectively that extend inwardly therefrom to define an opening therein to receive said protuberance;

said opening is substantially circular to allow pivoting attachment of said protuberance therein;

said first lip and said second lip decrease a distance of said opening such that said protuberance is engaged therein and allows retraction of said diaphragm; and said diaphragm is substantially oval and has a major axis and a minor axis and said connecting means extends along a substantial length of said minor axis on a second side of said diaphragm and a projection extends along a said minor axis on a first side of said diaphragm, and said projection biases against said inner surface of said cap and hermetically prohibits fluid flow between a first aperture and a second aperture.

22. A valve apparatus for accurately controlling flow of fluids, comprising:

a cap having an inner surface and an outer surface, a first cavity and a second cavity extending through said cap to allow fluid flow therebetween;

an actuation means for receiving said cap thereon, and a void being defined through said actuation means;

a diaphragm removably engaging said inner surface and being of sufficient size to occlude said first cavity and said second cavity simultaneously; and a first member being maintained within said void of said actuation means, and said first member engaging said diaphragm and forcing said diaphragm against said inner surface as a result of a resilient means in a deactivated state, and said actuation means withdrawing said diaphragm in an activated state, whereby control of fluid flow between said first cavity and said second cavity is achieved;

an extension being of small diameter than a protuberance attaches said protuberance to said first member;

a connecting means is located on said diaphragm and engages said protuberance in a swiveling manner;

said connecting means further comprising a first prominence and a second prominence opposing one another and having a first lip and a second lip respectively that extend inwardly therefrom to define an opening therein to receive said protuberance;

said opening is substantially circular to allow pivoting attachment of said protuberance therein;

said first lip and said second lip decrease a distance of said opening such that said protuberance is engaged therein and allows retraction of said diaphragm; and said diaphragm is substantially oval and has a major axis and a minor axis and said connecting means extends along a substantial length of said minor axis on a second side of said diaphragm and a projection extends along a said minor axis on a first side of said diaphragm, and said projection biases against said inner surface of said cap and hermetically prohibits fluid flow between a first aperture and a second aperture; and said protuberance is removable from said connecting means when moved in a plane parallel to said diaphragm.

23. A valve assembly for controlling fluid flow, comprising:

a cap having an inner surface and an outer surface, a first cavity and a second cavity extending through said cap to allow fluid flow therebetween, and a wall on said inner surface separating said first cavity and said second cavity;

a diaphragm removably biasing against said wall and said inner surface and begin of sufficient size to occlude said first cavity and said second cavity simultaneously when biased against said inner surface and said wall;

a first component having a seat portion and an actuation portion and a void being axially defined therethrough, said seat portion being adapted to receive said cap thereon to maintain said diaphragm therebetween; and a first member being maintained within said void in a movable manner and said first member engaging said diaphragm in an adjustable manner on a side distal to said cap, and said first member forcing said diaphragm against said inner surface and said wall as a result of a resilient means in a deactivated state and an actuation means withdrawing said diaphragm in an activated state to control fluid flow; and said diaphragm is substantially elliptical in shape and further comprises a major axis and a minor axis, a first projection extending along said minor axis and being adapted to removably engage said wall on said cap, and a peripherally contiguous second projection being equidistantly spaced from an outer edge of said diaphragm and being sufficiently positioned to enclose said first and second cavity.

* * * * *